United States Patent
Vermeersch et al.

(10) Patent No.: US 9,969,260 B2
(45) Date of Patent: May 15, 2018

(54) STEERING COLUMN MOUNTED TELESCOPING TRANSMISSION SHIFTER

(71) Applicant: STEERING SOLUTIONS IP HOLDING CORPORATION, Saginaw, MI (US)

(72) Inventors: Michael C. Vermeersch, Essexville, MI (US); Arthur W. Nellett, Davison, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days. days.

(21) Appl. No.: 14/601,633

(22) Filed: Jan. 21, 2015

(65) Prior Publication Data

US 2015/0202960 A1    Jul. 23, 2015

Related U.S. Application Data

(60) Provisional application No. 61/930,693, filed on Jan. 23, 2014.

(51) Int. Cl.
  *B60K 20/06* (2006.01)
  *F16H 59/02* (2006.01)
(52) U.S. Cl.
  CPC ............ *B60K 20/06* (2013.01); *F16H 59/02* (2013.01); *Y10T 74/20146* (2015.01)
(58) Field of Classification Search
  CPC ... B60K 20/06; F16H 59/02; Y10T 74/20146; Y10T 74/20152
  USPC .......................................... 74/473.31, 473.32
  See application file for complete search history.

(56) References Cited

U.S. PATENT DOCUMENTS

| | | | | |
|---|---|---|---|---|
| 3,596,531 A | * | 8/1971 | Grosseau | B01L 7/02 74/473.32 |
| 4,132,123 A | * | 1/1979 | Ishii | F16H 61/34 74/473.31 |
| 4,267,743 A | * | 5/1981 | Tanaka | B60K 20/06 180/78 |
| 4,480,494 A | * | 11/1984 | Gilmore | B60K 20/06 74/473.31 |
| 4,537,088 A | * | 8/1985 | Kubota | B60K 20/06 74/473.21 |
| 4,762,015 A | * | 8/1988 | Katayama | B62D 1/184 280/775 |
| 4,805,476 A | | 2/1989 | Beauch et al. | |
| 4,936,431 A | * | 6/1990 | Shinpo | F16H 59/10 137/74 |
| 4,955,935 A | * | 9/1990 | Katayama | B60K 20/06 192/220.2 |
| 5,022,504 A | | 6/1991 | Kobayashi | |
| 5,492,031 A | * | 2/1996 | Hedderly | B60K 20/06 200/61.27 |
| 7,125,027 B2 | | 10/2006 | Sap | |
| 7,278,526 B2 | | 10/2007 | Vermeersch et al. | |

(Continued)

*Primary Examiner* — Barry Gooden, Jr.
(74) *Attorney, Agent, or Firm* — Cantor Colburn LLP

(57) ABSTRACT

A glide system for a vehicle shift mechanism includes a steering column having a stationary portion and a moveable portion in telescoping engagement with the stationary portion. Also included is a shifter operatively coupled to the moveable portion of the steering column and slidably engaged with the stationary portion of the steering column. Further included is a de-lashing element engaged with a sliding member of the shifter.

19 Claims, 10 Drawing Sheets

(56) References Cited

U.S. PATENT DOCUMENTS

| | | |
|---|---|---|
| 7,469,616 B2 | 12/2008 | Fujiu et al. |
| 7,621,562 B2 | 11/2009 | Longo |
| 7,690,685 B2 | 4/2010 | Sasaoka |
| 8,342,574 B2 | 1/2013 | Bahr et al. |
| 8,783,718 B1 | 7/2014 | Clark et al. |
| 8,919,220 B2 | 12/2014 | Moriyama et al. |
| 8,943,923 B2 | 2/2015 | Kakishita |
| 9,145,162 B2 | 9/2015 | Butler et al. |
| 2001/0022111 A1* | 9/2001 | Ritchie .................. B60K 20/06 74/473.31 |
| 2001/0029802 A1 | 10/2001 | Bowerman |
| 2003/0075913 A1* | 4/2003 | Li .......................... B62D 1/195 280/777 |
| 2003/0213673 A1* | 11/2003 | Burr ...................... F16H 59/105 192/220.2 |
| 2005/0127656 A1 | 6/2005 | Sato |
| 2005/0183534 A1 | 8/2005 | Maida |
| 2005/0189756 A1* | 9/2005 | Ridgway ................ B62D 1/195 280/775 |
| 2006/0082122 A1* | 4/2006 | Uehle .................. B60Q 1/1469 280/779 |
| 2008/0150269 A1 | 6/2008 | Longo |
| 2008/0238068 A1 | 10/2008 | Kumar |
| 2008/0257097 A1 | 10/2008 | Graf |
| 2009/0056493 A1* | 3/2009 | Dubay .................. B62D 1/185 74/492 |
| 2009/0241721 A1 | 10/2009 | Inoue |
| 2010/0219624 A1 | 9/2010 | Matsuno |
| 2010/0301593 A1 | 12/2010 | Sakata |
| 2011/0185839 A1 | 8/2011 | Inoue |
| 2012/0125139 A1 | 5/2012 | Tinnin |
| 2012/0285286 A1 | 11/2012 | Schnitzer |
| 2014/0000405 A1 | 1/2014 | Anspaugh |
| 2015/0202961 A1* | 7/2015 | Vermeersch ........... B62D 1/184 74/473.31 |
| 2015/0266497 A1 | 9/2015 | Yoshihara |
| 2015/0360712 A1 | 12/2015 | Baumeister |
| 2015/0375771 A1 | 12/2015 | Tinnin |
| 2016/0010689 A1* | 1/2016 | Ishibashi ............... F16C 19/463 384/560 |
| 2016/0059880 A1 | 3/2016 | Bouvier |
| 2016/0075367 A1 | 3/2016 | Sakuda |
| 2016/0243938 A1 | 8/2016 | Vermeersch et al. |

* cited by examiner

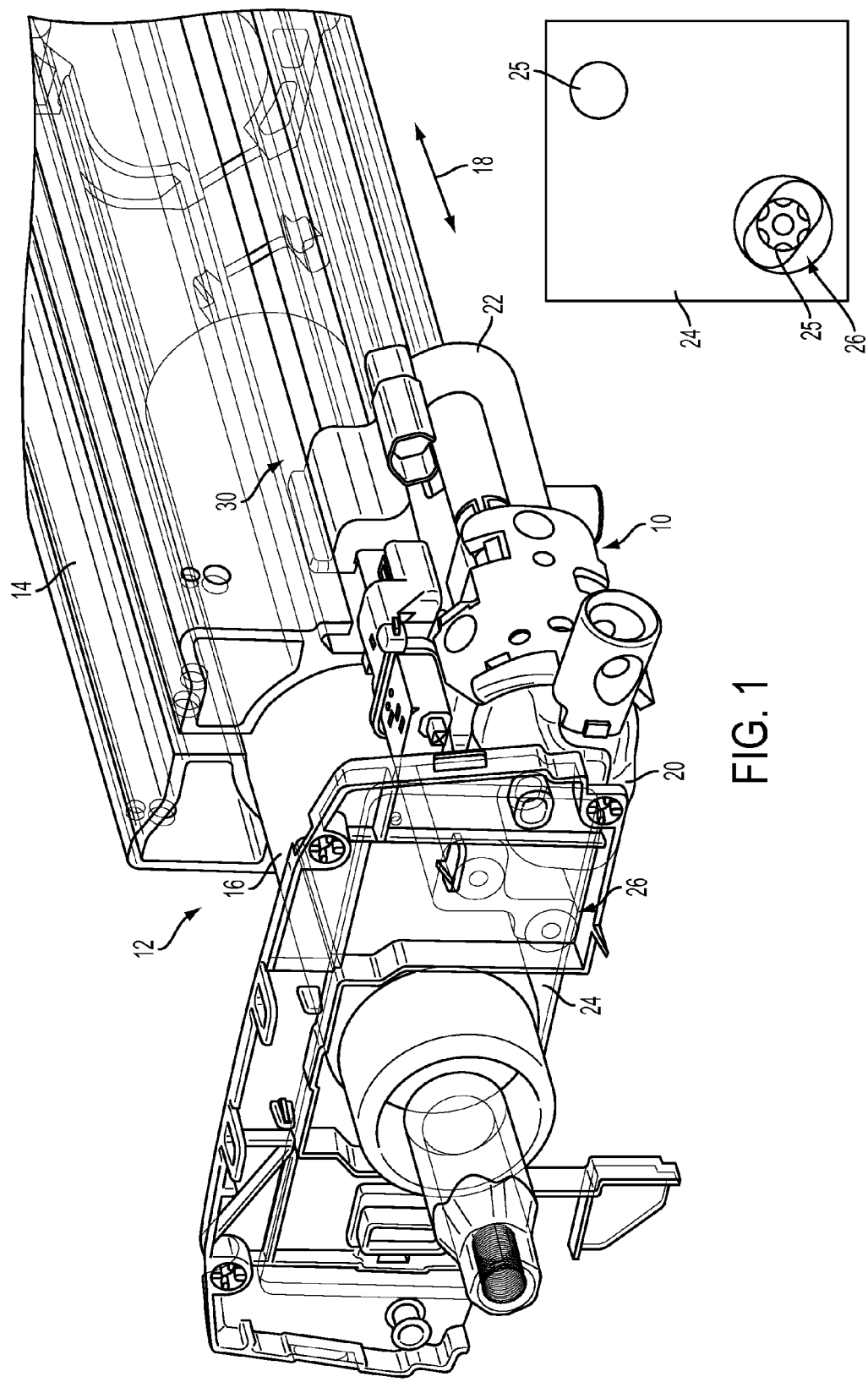

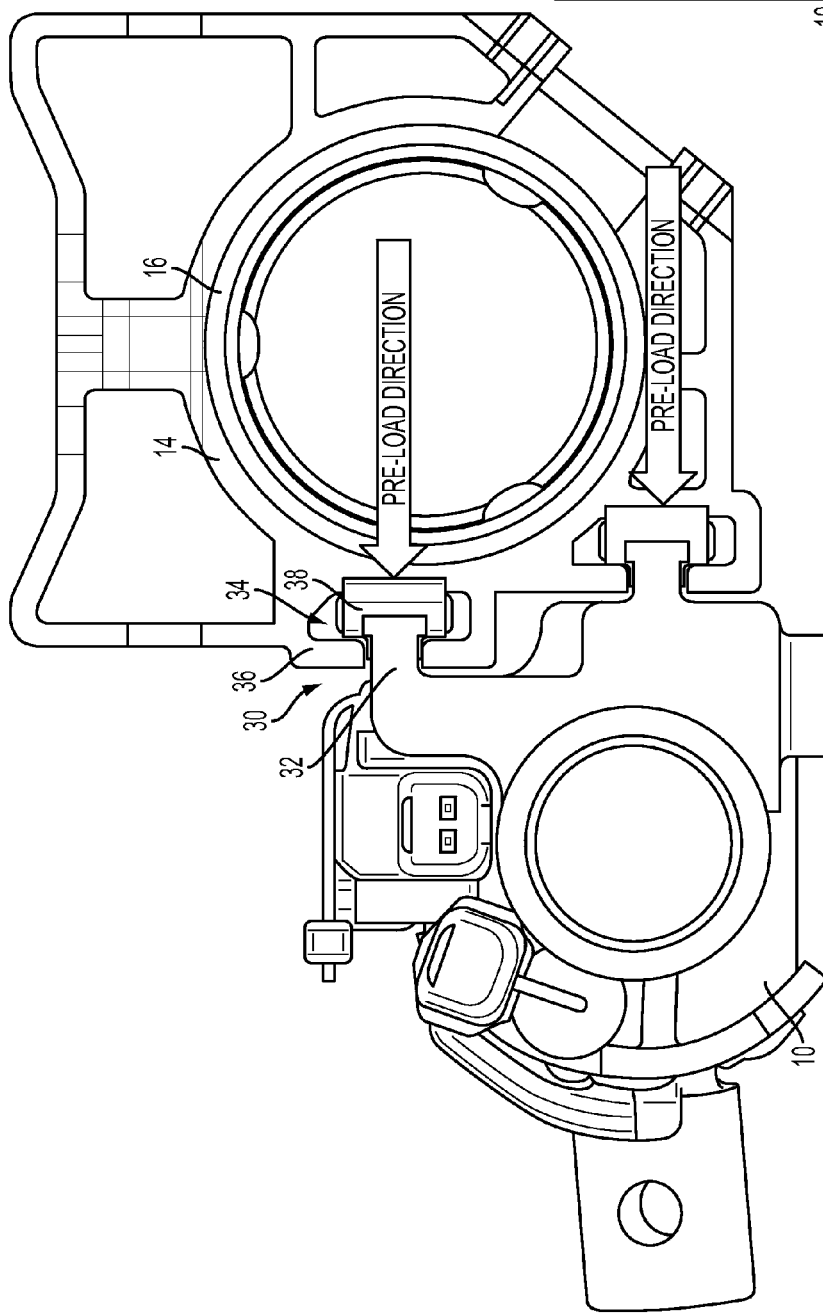
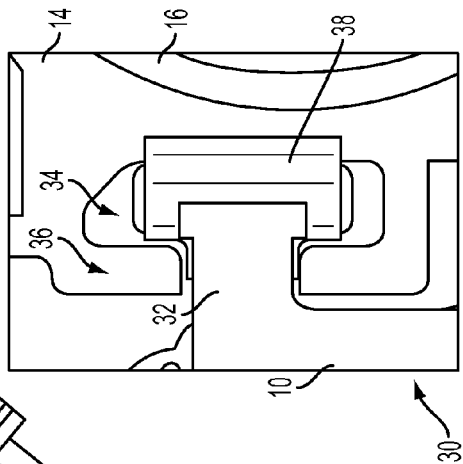
FIG. 5
FIG. 6

STEERING COLUMN MOUNTED TELESCOPING TRANSMISSION SHIFTER

CROSS-REFERENCE TO RELATED APPLICATIONS

This patent application claims priority to U.S. Provisional Patent Application Ser. No. 61/930,693, filed Jan. 23, 2014, which is incorporated herein by reference in its entirety.

BACKGROUND OF THE INVENTION

The subject matter disclosed herein relates to steering column mounted transmission shifters and, more particularly, to a glide system for shifter mechanisms mounted to steering columns.

Internally collapsing steering column designs that are cantilever in nature generally have low stiffness and poor natural frequency. If the application requires a column mounted shift system, the location of the shifter poses challenges.

If the shifter is mounted forward in the vehicle on a stationary structure portion of the steering column, the shift lever requires a severe off-set and/or the shift mechanism is cantilevered rearward (towards the driver) which creates a moment and high stress on the attachment. Conversely, mounting the shifter rearward in the vehicle on the upperhead telescoping portion of the steering column creates issues with collapse, NVH and anti-rotation reaction loads from the shift lever.

SUMMARY OF THE INVENTION

In accordance with an exemplary embodiment of the invention, a glide system for a vehicle shift mechanism includes a steering column having a stationary portion and a moveable portion in telescoping engagement with the stationary portion. The glide system also includes a shifter operatively coupled to the moveable portion of the steering column and slidably engaged with the stationary portion of the steering column. The glide system further includes a leaf spring engaged with and partially surrounding a sliding member of the shifter.

In accordance with another exemplary embodiment of the invention, a glide system for a vehicle shift mechanism includes a steering column having a stationary portion and a moveable portion in telescoping engagement with the stationary portion. The glide system also includes a shifter operatively coupled to the moveable portion of the steering column and slidably engaged with the stationary portion of the steering column. The glide system further includes a bushing engaged with and partially surrounding a sliding member of the shifter.

In accordance with yet another exemplary embodiment of the invention, a glide system for a vehicle shift mechanism includes a steering column having a stationary portion and a moveable portion in telescoping engagement with the stationary portion. The glide system also includes a shifter operatively coupled to the moveable portion of the steering column and slidably engaged with the stationary portion of the steering column. The glide system further includes a roller assembly operatively coupled to a sliding member of the shifter and configured to bias the shifter radially outwardly and facilitate rolling along a surface of the stationary portion of the steering column.

In accordance with yet another exemplary embodiment of the invention, a glide system for a vehicle shift mechanism includes a steering column having a stationary portion and a moveable portion in telescoping engagement with the stationary portion. Also included is a shifter operatively coupled to the moveable portion of the steering column and slidably engaged with the stationary portion of the steering column. Further included is a de-lashing element engaged with a sliding member of the shifter.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a partial perspective view of a shifter mechanism operatively coupled to a steering column with a glide system according to an embodiment of the invention;

FIG. 2 is an enlarged view of a fastening assembly of the shifter mechanism;

FIG. 5 is an end view of the shifter mechanism and steering column according to the embodiment of FIG. 1;

FIG. 6 is an end view of the glide assembly according to the embodiment of FIG. 1;

DETAILED DESCRIPTION

Figure 3:
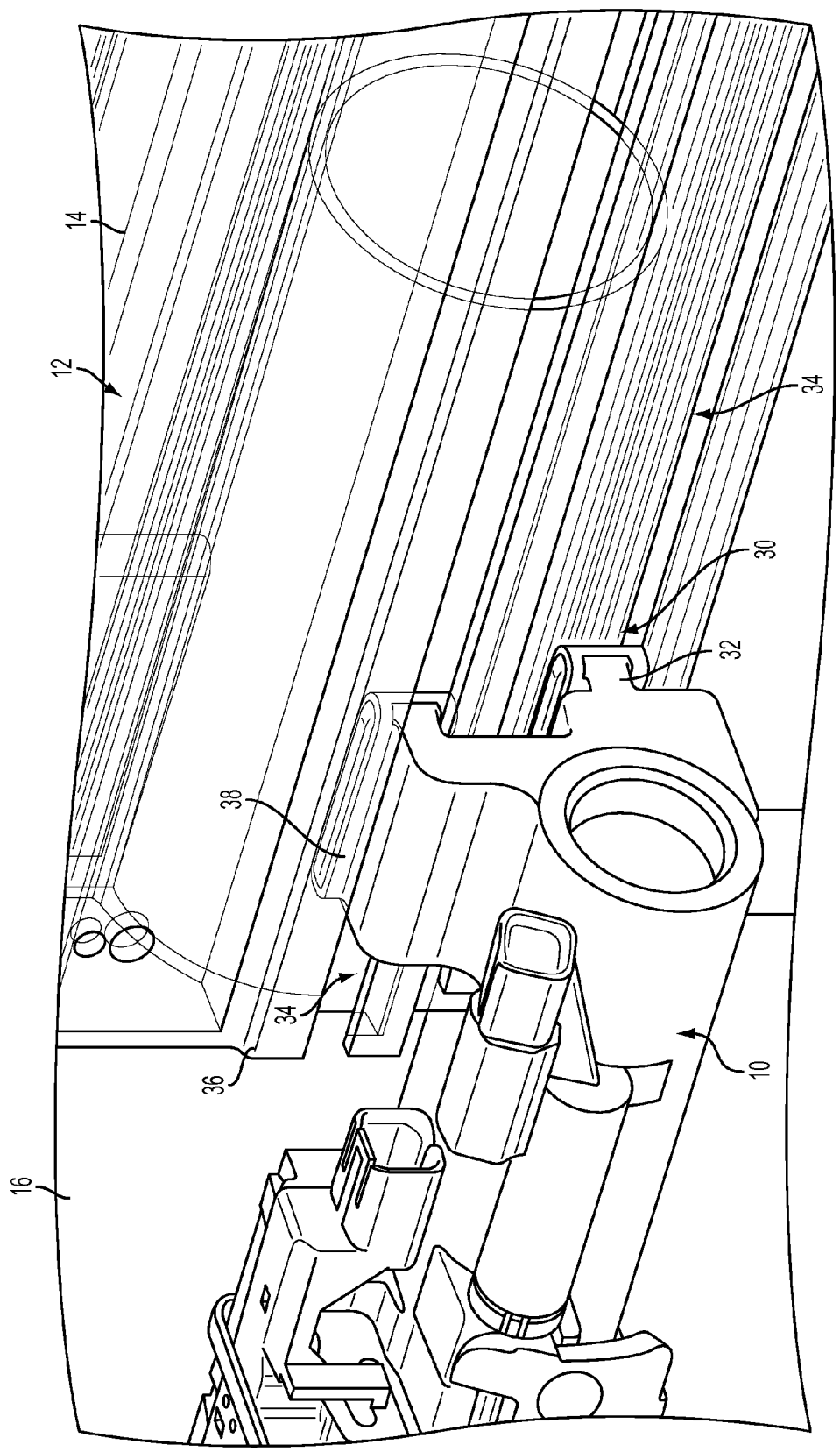
FIG. 3 is a perspective view of the glide assembly according to the embodiment of FIG. 1.

Referring now to the Figures, where the invention will be described with reference to specific embodiments, without limiting same, a glide system for operatively coupling a shifter mechanism to a vehicle steering column is disclosed.

Referring to FIG. 1, a shifter mechanism is generally shown at 10. The shifter mechanism 10 is for a vehicle having a transmission. As shown, the shifter mechanism 10 is mounted to the vehicle at a steering column 12 and is connected to the transmission as is known in the art. The shifter mechanism 10 operates the transmission by changing drive gears of the transmission.

The steering column 12 includes a stationary portion 14 and a moveable portion 16. The moveable portion 16 is in telescoping engagement with the stationary portion 14. The telescoping relationship between the moveable portion 16 and the stationary portion 14 advantageously allows a user to adjust a steering wheel (not shown) of a vehicle in a translatable manner to a desirable position. Additionally, the telescoping relationship facilitates a collapsible function of the steering column 12 in the event of an energy absorption event, such as impact by the user with the steering wheel.

As will be appreciated from the description herein, the shifter mechanism 10 is engaged with both the stationary portion 14 and the moveable portion 16 of the steering column 12 to avoid a cantilevered disposition of the shifter mechanism 10, thereby reducing excessive moments, while also accommodating the collapsibility requirements of the steering column 12.

The shifter mechanism 10 extends in a longitudinal direction 18 from a first end region 20 to a second end region 22. The first end region 20 is operatively to the moveable portion 16 of the steering column 12. In one embodiment, the operative coupling is made indirectly by coupling the shifter mechanism 10 to a plate 24 that is secured to the moveable portion 16. Coupling of the first end region 20 to the plate 24 is made in any suitable manner, including with mechanical fasteners 25 such as bolts, pins or the like, for example (FIG. 2). In one embodiment, the plate 24 includes one or more recessed regions 26 in the form of a countersink or counterbore to accommodate a head of a mechanical fastener to easily identify fastener location and to maintain a flush surface along the plate 24.

Referring now to FIG. 3, with continued reference to FIG. 1, a glide system 30 is illustrated in association with the shifter mechanism 10 and the stationary portion 14 of the steering column 12. This glide system 30 mounts the shifter mechanism 10 to the stationary portion 10 in a translatable manner to facilitate sliding of the shifter mechanism 10, as needed. The glide system 30 provides primary reaction to shift loads without requiring a permanent traditional fastener.

The glide system 30 includes a sliding member 32 extending from the shifter mechanism 10 as a protrusion. The sliding member 32 may be in the form of numerous contemplated geometries. In one embodiment, the sliding member 32 is substantially "T-shaped." The sliding member 32 is disposed within a slot 34 defined by the stationary portion 14 of the steering column 12. In one embodiment, the stationary portion 14 includes a bracket 36 extending therefrom, with the bracket 36 defining the slot 34. The bracket may be a separate component that is operatively coupled to the stationary portion 14 or may be integrally formed with the stationary portion 14. Regardless, the sliding member 32 is disposed within the slot 34 in a manner that allows for sliding movement of the sliding member 32 and therefore the shifter mechanism 10 as a whole. Although a single sliding member and slot are described above, as shown in the illustrated embodiments, a plurality of sliding members and slots are provided in some embodiments.

The slot 34 is dimensioned to accommodate a predetermined full collapse range for energy absorption. The distance required will vary depending upon the particular application of use. The slot 34 includes an open end on at least one side of the extrusion to allow access for assembly and/or serviceability. In one embodiment, the slot 34 is open at both ends to permit access from either end.

Figure 4:
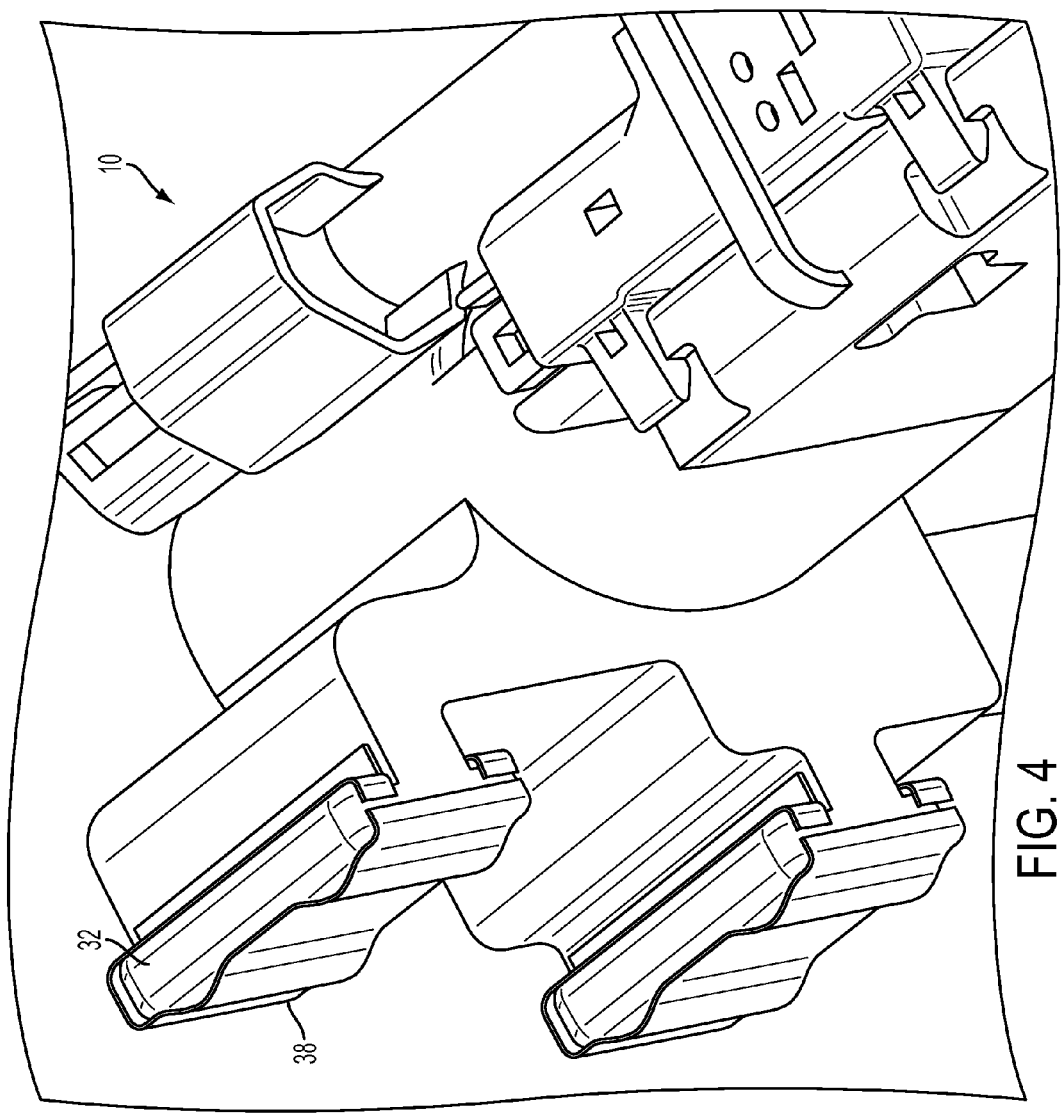
FIG. 4 is a perspective view of the glide system according to another aspect of the embodiment of FIG. 1.
Figure 7:
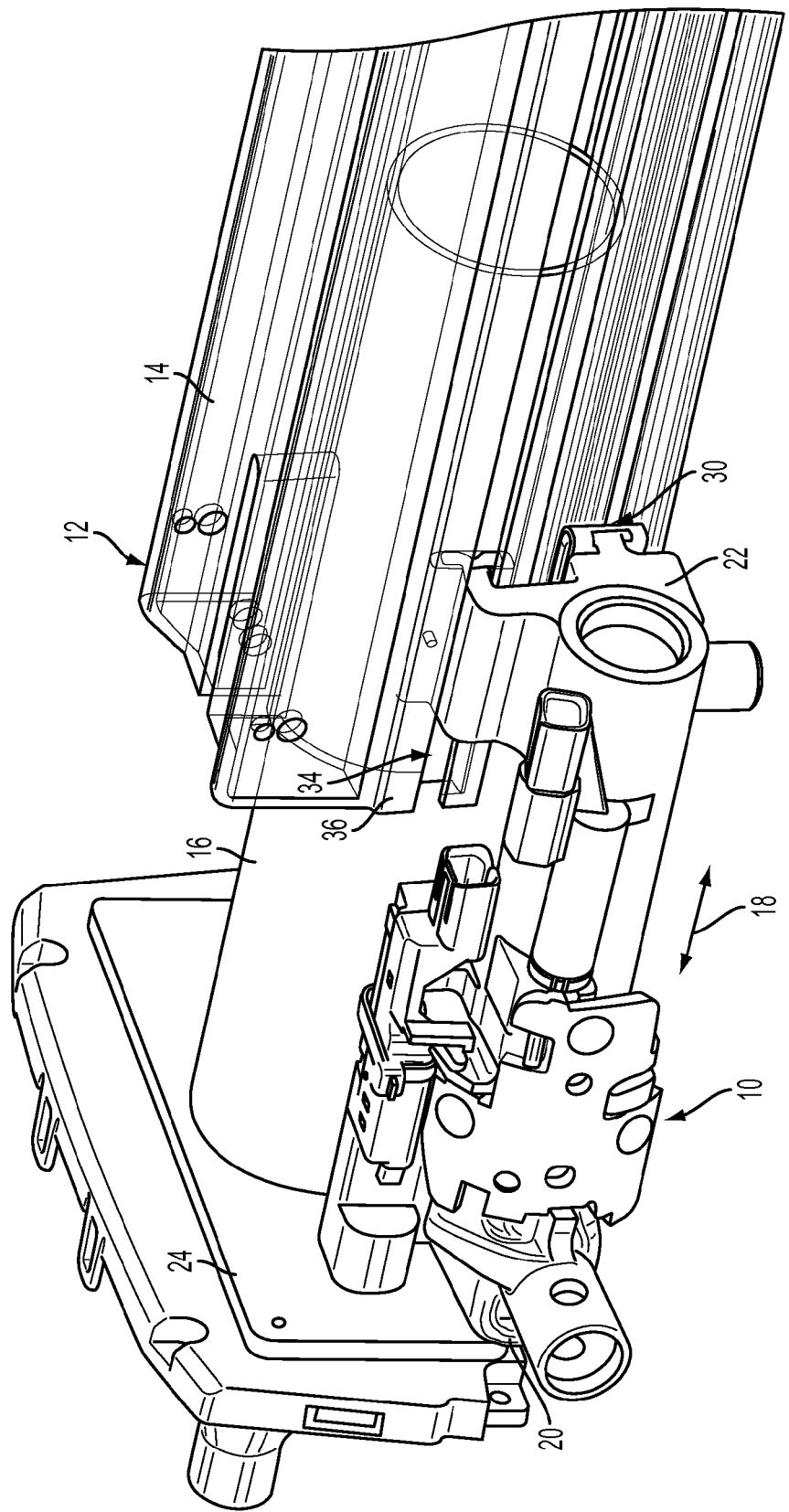
FIG. 7 is a perspective view of the shifter mechanism operatively coupled to the steering column with a glide system according to another embodiment of the invention.

Referring now to FIGS. 4-6, a leaf spring 38 is engaged with and partially surrounds the sliding member 32 of the shifter mechanism 10. The leaf spring 38 is pre-loaded (FIG. 5) to position the sliding member 32 firmly against one or more surfaces of the slot 34 to de-lash the connection during the normal motion of the shifter mechanism 10. The leaf spring 38 also provides minimal axial resistance to accommodate telescoping adjustment. The leaf spring 38 may be made from numerous contemplated materials, but in one embodiment the leaf spring 38 comprises spring steel. For embodiments having a plurality of sliding members and slots, a plurality of leaf springs may be provided for each sliding member.

Referring to FIGS. 7-10, another embodiment of the glide system 30 is illustrated. Similar to the previously described embodiment, the glide system 30 operatively couples the shifter mechanism 10 to the moveable portion 16 of the steering column 12 and provides sliding engagement between the shifter mechanism 10 and the stationary section 14 of the steering column 12.

In the illustrated embodiment, a bushing 40 is engaged with and partially surrounds the sliding member 32 of the shifter mechanism 10. The bushing positions the sliding member 32 firmly against one or more surfaces of the slot 34 to de-lash the connection during the normal motion of the shifter mechanism 10. The bushing 40 may be formed from numerous contemplated materials, but in one embodiment the bushing 40 comprises injection molded plastic. The bushing 40 also provides minimal axial resistance to accommodate telescoping adjustment. As shown and as noted above, a plurality of sliding members and slots are provided in some embodiments. In such embodiments a plurality of bushings may be provided for each sliding member.

Figure 8:
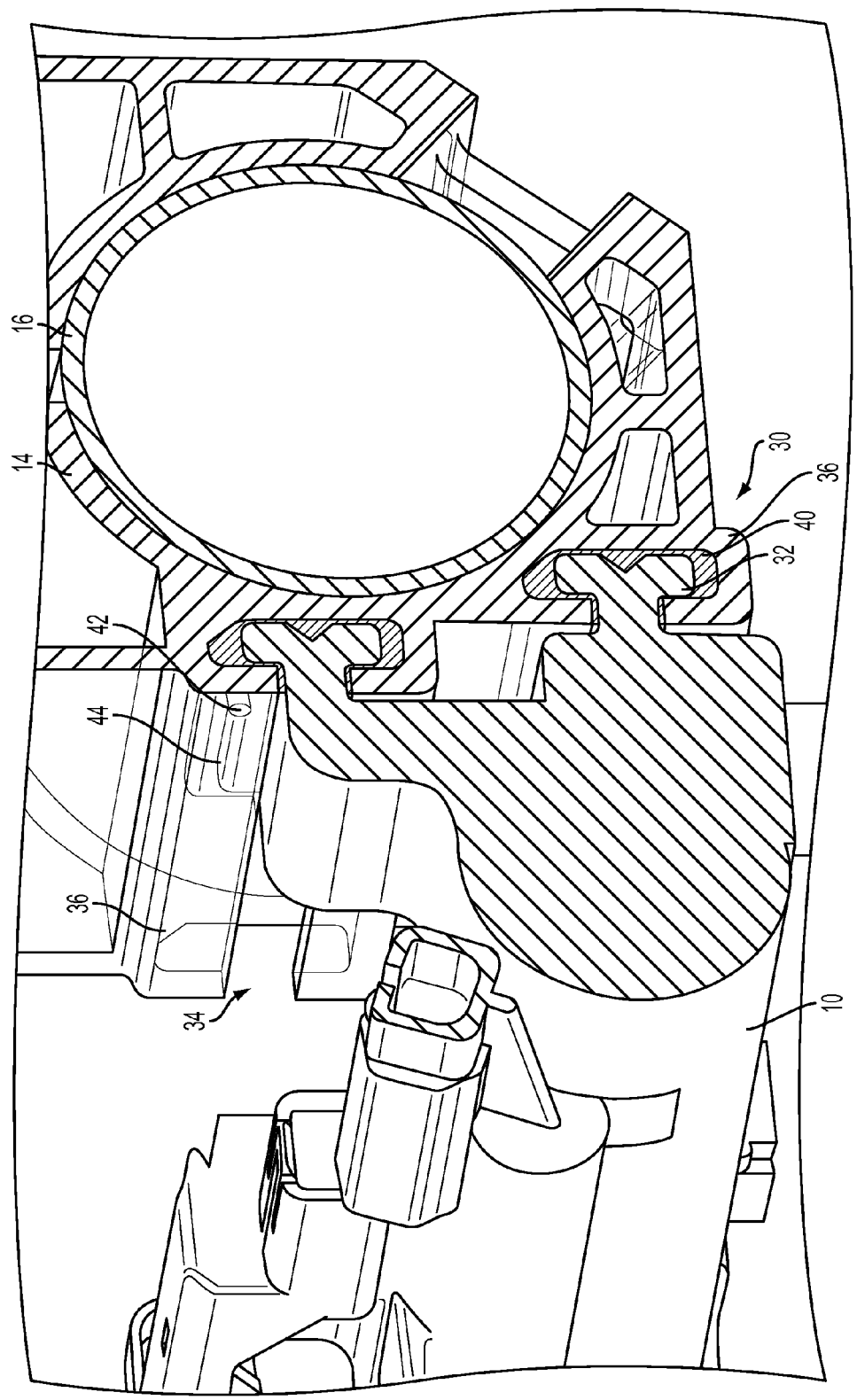
FIG. 8 is a perspective view of the glide system of the embodiment of FIG. 7.
Figure 9:
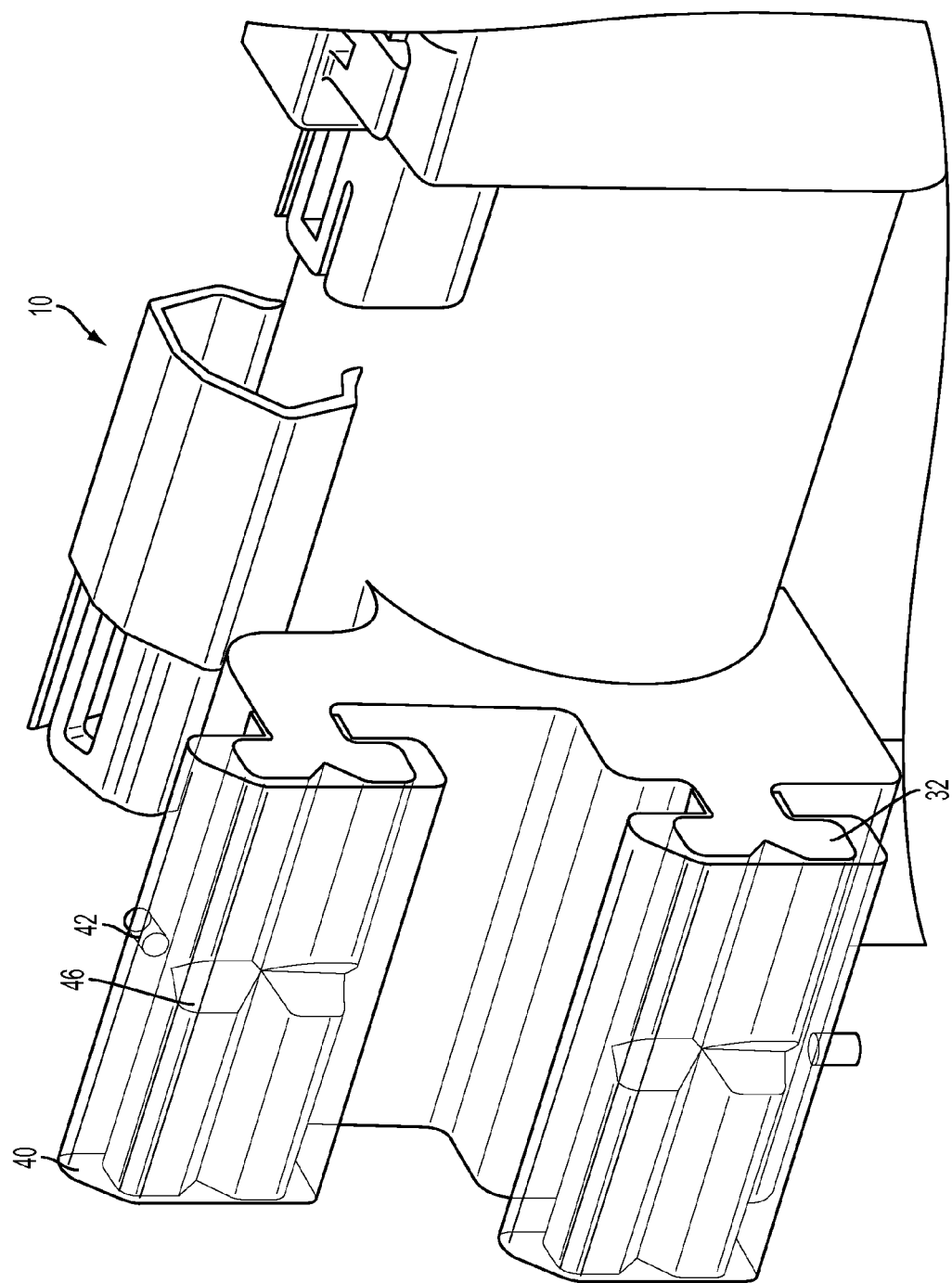
FIG. 9 is a perspective view of the glide system according to another aspect of the embodiment of FIG. 7.
Figure 10:
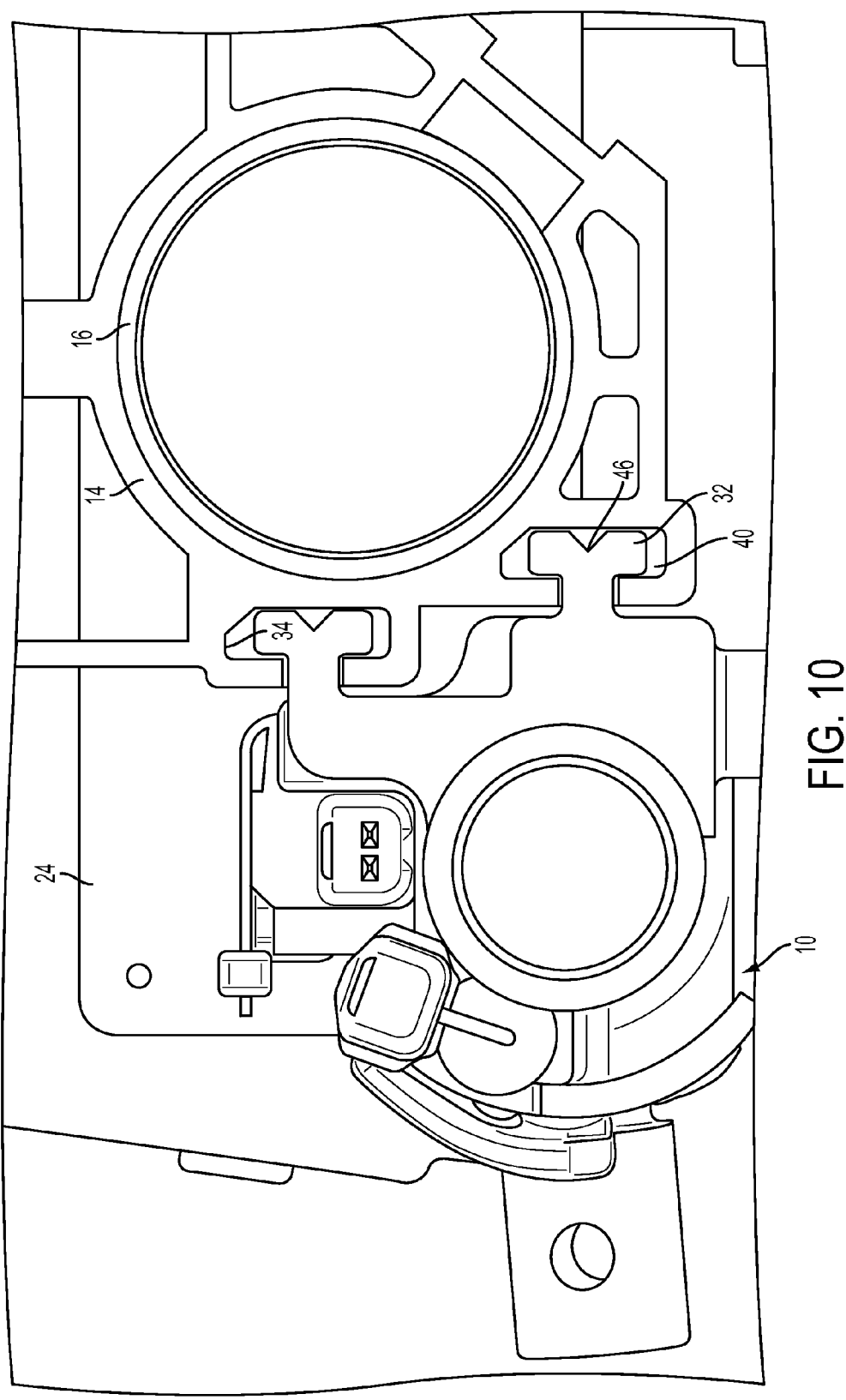
FIG. 10 is an end view of the shifter mechanism and steering column according to the embodiment of FIG. 7.
Figure 12:
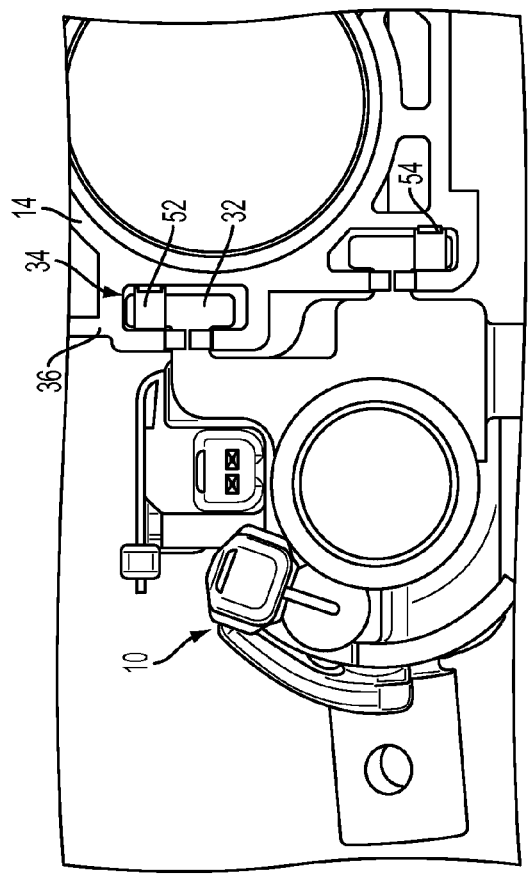
FIG. 12 is an end view of the shifter mechanism and steering column according to the embodiment of FIG. 11.
Figure 13:
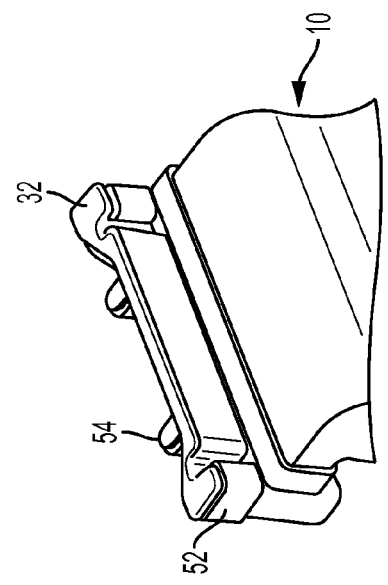
FIG. 13 is a perspective view of the glide system according to another aspect of the embodiment of FIG. 11.
Figure 11:
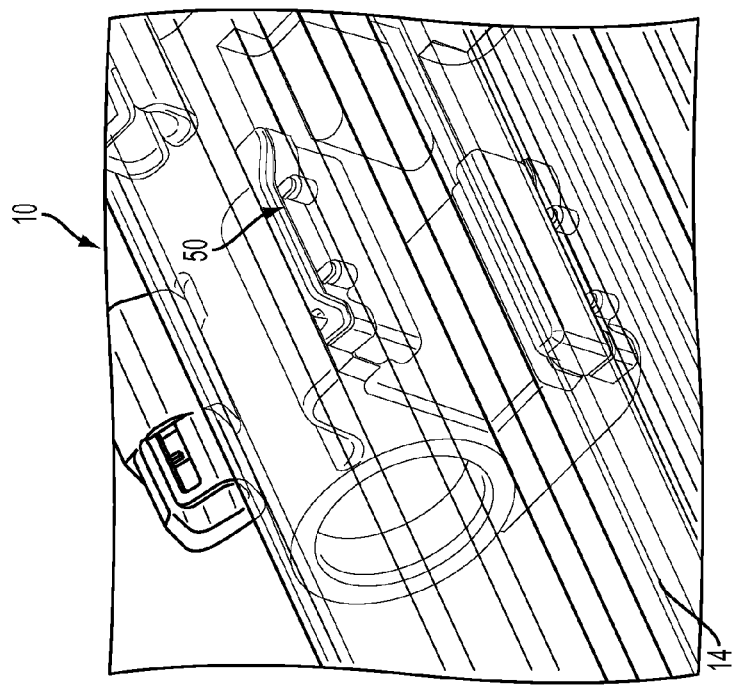
FIG. 11 is a perspective view of a shifter mechanism operatively couple to a steering column with a glide system according to yet another aspect of the invention.
Figure 14:
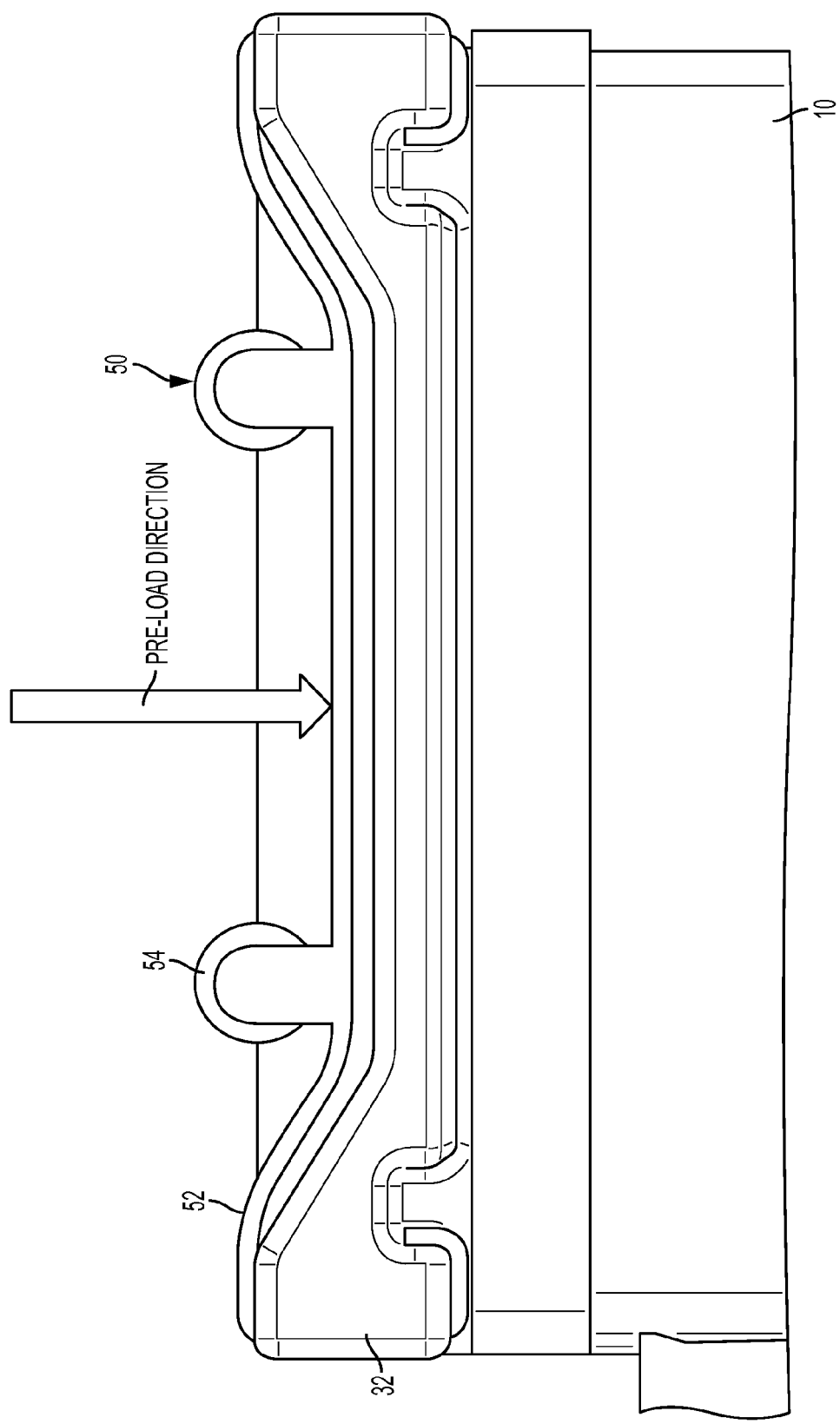
FIG. 14 is a schematic representation of the glide system according to the embodiment of FIG. 11.

As shown best in FIGS. 8 and 9, in some embodiments the bushing 40 includes at least one pin 42 extending therefrom. The pin 42 is slidably disposed within a groove 44 defined by the stationary portion 14, such as within the bracket 36, as shown. The groove 44 in the slot 34 provides a location for injection of the bushings and becomes an initial shear point for the telescoping adjustment feature. Bushing retention features 46 in the form of detents or the like are cast into the sliding member to maintain desired location of the bushing 40 during the telescope adjustment motion.

Referring to FIGS. 11-14, yet another embodiment of the glide system 30 is illustrated. The glide system 30 includes a roller assembly 50 operatively coupled to the sliding member 32 of the shifter mechanism 10 and configured to bias the sliding member 32 radially outwardly to facilitate rolling along a surface of the slot 34 defined by the stationary portion 14 of the steering column 12. For embodiments having a plurality of sliding members and slots, a plurality of roller assemblies may be provided for each sliding member.

A leaf spring 52 is engaged with and partially surrounds the sliding member 32 of the shifter mechanism 10. The leaf spring 52 is pre-loaded (FIG. 14) to position the sliding member 32 firmly against one or more surfaces of the slot 34 to de-lash the connection during the normal motion of the shifter mechanism 10. The leaf spring 52 may be made from numerous contemplated materials, but in one embodiment the leaf spring 52 comprises spring steel. Coupled to the leaf spring 52 is at least one roller 54 that is in contact with the surface of the slot 34 and provides minimal axial resistance to accommodate telescoping adjustment.

Advantageously, each of the embodiments described above provides a coupled interface between the shifter mechanism 10 and the steering column 12 at both the stationary portion 14 and the moveable portion 16 of the steering column 12 to enhance the stiffness of the system, while also accommodating the telescoping requirements of the steering column.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A glide system for a vehicle shift mechanism comprising:
   a steering column having a stationary portion and a moveable portion in telescoping engagement with the stationary portion;
   a shifter operatively coupled to the moveable portion of the steering column and slidably engaged with the stationary portion of the steering column; and
   at least one leaf spring engaged with and partially surrounding at least one sliding member of the shifter.

2. The glide system of claim 1, further comprising:
   the at least one sliding member is a plurality of sliding members of the shifter;
   the at least one leaf spring is a plurality of leaf springs, each of the plurality of leaf springs engaged with and partially surrounding one of the plurality of sliding members; and
   a plurality of brackets defining a plurality of slots extending longitudinally along the stationary portion of the steering column, the plurality of leaf springs and the plurality of sliding members slidably disposed within the plurality of slots.

3. The glide system of claim 1, wherein the at least one sliding member comprises a T-shaped geometry.

4. The glide system of claim 1, wherein the leaf spring comprises pre-loaded spring steel.

5. The glide system of claim 1, further comprising a bracket extending from the stationary portion, the bracket defining a slot extending longitudinally along the stationary portion, the at least one leaf spring and the at least one sliding member slidably disposed within the slot.

6. The glide system of claim 5, wherein the bracket is integrally formed with the stationary portion.

7. The glide system of claim 1, wherein the shifter is operatively coupled to the moveable portion with at least one mechanical fastener secured to a plate coupled to the moveable portion.

8. The glide system of claim 7, wherein the plate comprises a recessed region that the mechanical fastener is disposed within.

9. The glide system of claim 8, wherein the recessed region comprises of one of a countersink and a counterbore.

10. A glide system for a vehicle shift mechanism comprising:
    a steering column having a stationary portion and a moveable portion in telescoping engagement with the stationary portion;
    a shifter operatively coupled to the moveable portion of the steering column and slidably engaged with the stationary portion of the steering column; and
    at least one bushing engaged with and partially surrounding at least one sliding member of the shifter, wherein the at least one bushing comprises a pin extending therefrom, the pin slidably disposed within a groove defined by the stationary portion.

11. The glide system of claim 10, wherein the at least one bushing comprises an injection molded, plastic component.

12. The glide system of claim 10, further comprising:
    the at least one sliding member is a plurality of sliding members of the shifter;
    the at least one bushing is a plurality of bushings, each of the plurality of bushings engaged with and partially surrounding one of the plurality of sliding members; and
    a plurality of brackets defining a plurality of slots extending longitudinally along the stationary portion of the steering column, the plurality of bushings and the plurality of sliding members slidably disposed within the plurality of slots.

13. The glide system of claim 10, further comprising a bracket extending from the stationary portion, the bracket defining a slot extending longitudinally along the stationary portion of the steering column, the at least one bushing and the at least one sliding member slidably disposed within the slot.

14. The glide system of claim 13, wherein the bracket is integrally formed with the stationary portion.

15. A glide system for a vehicle shift mechanism comprising:
    a steering column having a stationary portion and a moveable portion in telescoping engagement with the stationary portion;
    a shifter operatively coupled to the moveable portion of the steering column and slidably engaged with the stationary portion of the steering column; and
    a roller assembly operatively coupled to a sliding member of the shifter and configured to bias the shifter radially outwardly and facilitate rolling along a surface of the stationary portion of the steering column.

16. The glide system of claim 15, further comprising a leaf spring engaged with and partially surrounding the sliding member of the shifter, the roller assembly extending from the leaf spring.

17. The glide system of claim 16, wherein the leaf spring comprises pre-loaded spring steel.

18. A glide system for a vehicle shift mechanism comprising:
    a steering column having a stationary portion and a moveable portion in telescoping engagement with the stationary portion;
    a shifter operatively coupled to the moveable portion of the steering column and slidably engaged with the stationary portion of the steering column; and
    a de-lashing element engaged with a sliding member of the shifter.

19. The glide system of claim 18, further comprising a bracket extending from the stationary portion, the bracket defining a slot extending longitudinally along the stationary portion, the de-lashing element and the sliding member slidably disposed within the slot.

* * * * *